April 2, 1968    W. O. JACOB ET AL    3,375,562
UPPER ROLLER FOR SPINNING MACHINE DRAWING MECHANISMS
Filed May 6, 1966    2 Sheets-Sheet 1

Inventors
Werner. O. Jacob
BY  Dielhelm. F. May

Hammond and Littell
ATTORNEYS

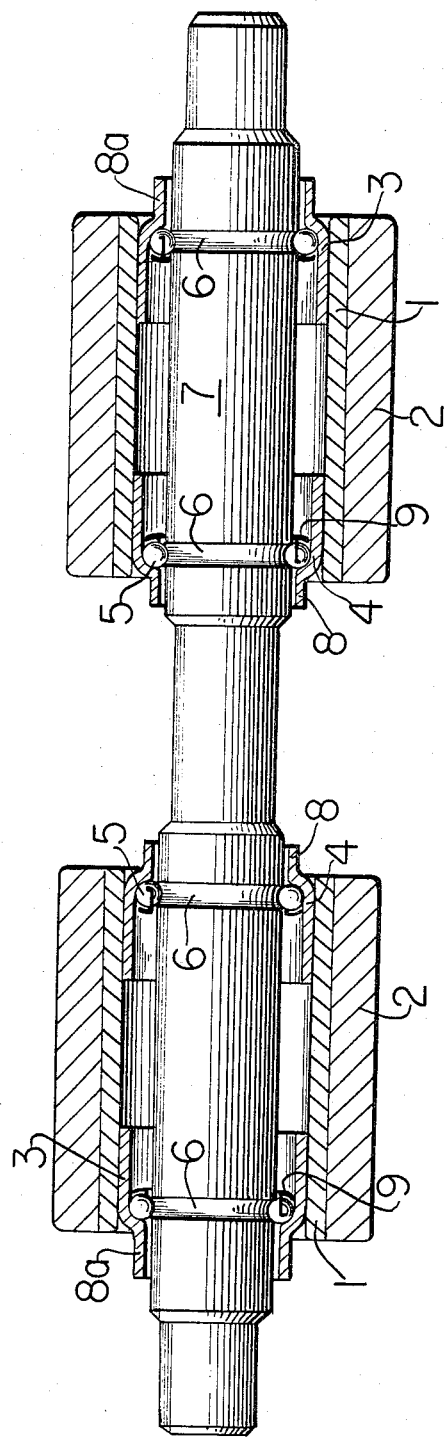

United States Patent Office 3,375,562
Patented Apr. 2, 1968

---

3,375,562
UPPER ROLLER FOR SPINNING MACHINE DRAWING MECHANISMS
Werner Otto Jacob, Frankfurt am Main, and Diethelm Friedrich May, Herzogenaurach, Germany, assignors to Industriewerk Schaeffler OHG, Herzogenaurach, Germany, a corporation of Germany
Filed May 6, 1966, Ser. No. 548,243
Claims priority, application Germany, May 21, 1965, J 28,176
3 Claims. (Cl. 29—116)

ABSTRACT OF THE DISCLOSURE

Novel upper rollers for drawing mechanisms in spinning machines, wherein the cylindrical drafting roller casings which have a resilient covering are securely connected with the outer races of rolling contact bearings arranged on the spindle.

---

Prior art

Figure 1:
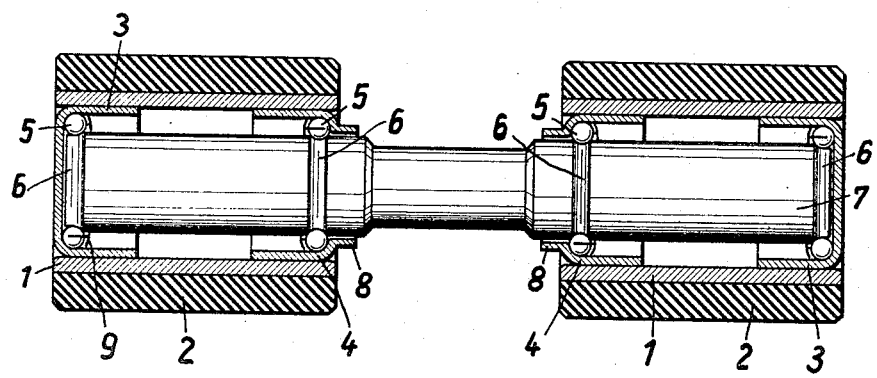

Such upper rollers have been known for a long time. Spinning machine manufacturers require that in addition to operating satisfactorily, the upper rollers should have a long working life and, more important, be simple and thus inexpensive in construction since very large numbers of such rollers are required for each individual spinning machine. It is true that there are upper rollers on the market which operate satisfactorily, but they are very expensive in their construction since they require multiple processing steps and machining costs are high. One suggestion that has been made is to provide the shaft of the upper rollers of the drawing mechanism with an essentially constant or uniform diameter to reduce the number of machining operations and, therefore, the costs. However, a completely satisfactory result could not be achieved since other structural elements, due to their construction did not permit a reasonably priced production and installation.

Objects of the invention

It is an object of the invention to provide an upper roller for drawing mechanisms in spinning machines which will function well for long periods of time and is simple and economical in construction.

This and other objects and advantages of the invention will become obvious from the following detailed description.

The invention

The upper roller of the invention for drawing mechanisms in spinning machines is comprised of a spindle provided with at least one bearing assembly, said bearing assembly being composed of two sets of ball bearings travelling in grooves in the spindle, thin-walled outer races for each set of ball bearings having at least one flange for absorbing forces operating in axial direction, at least one flange of an outer race forming directly or indirectly a seal with the spindle and a casing sleeve with a resilient cover surrounding and being rigidly secured to the outer races. Preferably, at least one flange of the outer races forms together with the spindle a sealing gap.

Upper rollers of drawing mechanisms wherein the ball bearings roll in grooves in the spindle and the outer races are made of thin-walled material are known, but these are so-called fixed rollers wherein two upper rollers of the drawing mechanism are rigidly secured to shaft and are disposed by means of bearings. In this type of arrangement, both rollers rotate with the same number of rotations due to their rigid connection to the shaft, which is particularly disadvantageous when the elastic covers of the upper rollers are worn to different degrees. Since the number of rotations of both rollers is usually the same, this causes different peripheral speeds which may cause the material being spun to either slide through without getting sufficiently stretched, or it may even tear. These disadvantages are avoided in upper rollers which are arranged in spaced distance from each other on a non-rotating shaft or spindle.

In the upper rollers of the invention, the casing sleeve with a resilient cover is securely connected to the outer races of the bearings, which has the advantage over upper rollers, whose casing is detachable from the outer races, of greater precision or accuracy, which is not minimized by frequent removal of the jacket because of constant wear. Since the ball bearings roll directly in grooves on the spindle or shaft, an inner race is not required. This, together with the use of thin-walled outer races, results in an extremely low radial construction height which has the advantage over known construction in permitting enlargement of the diameter of the spindle or shaft without enlarging the outer diameter of the upper rollers.

This results in a considerable rigidity of the shaft, which complies with the endeavor to increase the stress forces of the drawing mechanisms. The thin-walled outer races themselves are manufactured in a very simple and therefore inexpensive way, for example, by means of the drawing process. For the preferred utilization of sealing gaps, it is possible to form the outer races in a manner so that in the drawing process the flanges of the races are formed according to the character of the spindle or shaft in such a way that sealing gaps will result. No special measures are required for this as a corresponding shaping of the flanges is obtained automatically in the drawing process. Therefore, further sealing means can be omitted to obtain a further simplification of construction as compared to known upper rollers.

Referring now to the drawings:
FIG. 1 is an axial sectional of one embodiment of the upper roller of the invention.
FIG. 2 is an axial sectional view of another embodiment of an upper roller of the invention.

Referring now to FIG. 1, the upper roller is comprised of a spindle 7 with a casing sleeve 1 with a resilient plastic cover 2 at each end. Thin-walled metal outer races 3 and 4 are securely connected to the casing sleeve 1 and provide a raceway for ball bearings 5 which roll in grooves 6 of the spindle 7. The flanges 8 of outer race 4 have at this point a slightly larger diameter than the diameter of spindle 7 so that a sealing gap is formed between flange 8 and spindle 7. The ball bearings 5 are in cage 9 which keeps the distance between the balls constant. If the top roller is not of the type supported in the center as shown in FIG. 1, but is the type held at both ends as illustrated in FIG. 2, the outer races 3 have the shape of outer race 4 with flanges 8a similar to flanges 8 to provide a sealing gap.

Various modifications of the upper rollers of the invention may be made without departing from the spirit or scope thereof and it is to be understood that the invention is to be limited only as defined in the appended claims.

We claim:
1. An upper roller for drawing mechanisms of spinning machines comprising a spindle provided with one bearing assembly at each end, each said bearing assembly being comprised of two sets of ball bearings traveling in grooves in the spindle, thin-walled outer races for each set of ball bearings having at least one flange for absorbing forces operaitng in axial direction, at least one flange of an outer race forming a seal with the spindle and a casing sleeve with a resilient cover surrounding and being rigidly secured to the outer races.
2. An upper roller of claim 1 wherein at least one flange of the outer races together with the spindle forms a sealing gap.

3. An upper roller of claim 1 wherein the roller is supported at both ends and each outer race is provided with a flange forming together with the spindle a sealing gap.

References Cited

UNITED STATES PATENTS

| 2,730,771 | 1/1956 | Beck et al. | 29—116 |
| 2,861,829 | 11/1958 | Johanson et al. | |
| 2,885,247 | 5/1959 | Schlums | 29—116 X |
| 2,922,199 | 1/1960 | Dickey | 29—116 |
| 3,008,194 | 11/1961 | Sommer | 29—116 |
| 3,052,953 | 9/1962 | Swanson | 29—116 |

FOREIGN PATENTS

| 1,220,598 | 1/1960 | France. |
| 332,514 | 11/1935 | Italy. |

BILLY J. WILHITE, *Primary Examiner.*